United States Patent
Zeinstra et al.

(10) Patent No.: US 10,306,422 B2
(45) Date of Patent: May 28, 2019

(54) IN-VEHICLE ELECTRONIC DEVICE USAGE BLOCKER

(75) Inventors: Mark L. Zeinstra, Holland, MI (US); Philip J. Vanderwall, Marne, MI (US)

(73) Assignee: VISTEON GLOBAL TECHNOLOGIES, INC., Van Buren Township, MI (US)

( * ) Notice: Subject to any disclaimer, the term of this patent is extended or adjusted under 35 U.S.C. 154(b) by 22 days.

(21) Appl. No.: 13/978,540

(22) PCT Filed: Jan. 20, 2012

(86) PCT No.: PCT/US2012/021995
§ 371 (c)(1),
(2), (4) Date: Jul. 22, 2013

(87) PCT Pub. No.: WO2012/100141
PCT Pub. Date: Jul. 26, 2012

(65) Prior Publication Data
US 2013/0295908 A1 Nov. 7, 2013

Related U.S. Application Data

(60) Provisional application No. 61/435,069, filed on Jan. 21, 2011.

(51) Int. Cl.
*H04M 1/60* (2006.01)
*H04W 4/04* (2009.01)
*H04M 1/725* (2006.01)

(52) U.S. Cl.
CPC ......... *H04W 4/046* (2013.01); *H04M 1/6091* (2013.01); *H04M 1/72577* (2013.01)

(58) Field of Classification Search
CPC . H04W 4/046; H04M 1/6091; H04M 1/6075; H04M 1/6083
USPC .......... 455/563, 41.2, 418, 420, 419, 569.1, 455/569.2, 456.5; 340/5.61, 426.16
See application file for complete search history.

(56) References Cited

U.S. PATENT DOCUMENTS

| | | | |
|---|---|---|---|
| 7,856,203 B2 | 12/2010 | Lipovski | |
| 2003/0013504 A1* | 1/2003 | Park | B60N 3/02 455/569.2 |
| 2004/0230480 A1* | 11/2004 | Kanayama | G06Q 20/14 705/13 |
| 2008/0036623 A1 | 2/2008 | Rosen | |

(Continued)

*Primary Examiner* — Said M Elnoubi
(74) *Attorney, Agent, or Firm* — Dickinson Wright PLLC

(57) ABSTRACT

A method for controlling the operability and functionality of an electronic device with an electronic device detection system begins by determining whether an electronic device is located within the vehicle and proximate to an operator of the vehicle. The electronic device detection system defines a restricted zone in which electronic device use is partially or fully prohibited and a safe zone in which all or some of the functionality of electronic devices is enabled. Once it is determined that an electronic device is in use and within a restricted zone, a determination is made as to whether any usage prohibition conditions are satisfied. If usage prohibition conditions are satisfied, then particular functions of the electronic device may be disabled in a restricted zone. If prohibition conditions are not met, the electronic device may be totally enabled, partially enabled to allow certain functions, or the electronic device is never disabled.

10 Claims, 4 Drawing Sheets

(56) References Cited

U.S. PATENT DOCUMENTS

| | | | |
|---|---|---|---|
| 2009/0002147 A1 | 1/2009 | Bloebaum et al. | |
| 2010/0167691 A1* | 7/2010 | Howarter | H04M 1/72577 |
| | | | 455/410 |
| 2010/0323615 A1 | 12/2010 | Vock et al. | |
| 2011/0105097 A1* | 5/2011 | Tadayon | H04W 4/50 |
| | | | 455/418 |
| 2011/0167460 A1* | 7/2011 | Tranchina | B60N 2/879 |
| | | | 725/75 |
| 2011/0295458 A1* | 12/2011 | Halsey-Fenderson | |
| | | | B60K 28/10 |
| | | | 701/29.1 |
| 2012/0176249 A1* | 7/2012 | Chatterjee | G08B 13/1409 |
| | | | 340/686.6 |

\* cited by examiner

IN-VEHICLE ELECTRONIC DEVICE USAGE BLOCKER

CROSS-REFERENCE TO PRIOR APPLICATION

This U.S. National Stage Patent Application claims the benefit of International Application serial number PCT/US12/21995 filed Jan. 20, 2012, entitled "In-Vehicle Electronic Device Usage Blocker" and U.S. Provisional Patent Application Ser. No. 61/435,069 filed Jan. 21, 2011, entitled "In-Vehicle Electronic Device Usage Blocker," the entire disclosures of the applications being considered part of the disclosure of this application, and hereby incorporated by reference.

TECHNICAL FIELD

This invention relates generally to a system and method of prohibiting electronic device use in a vehicle, and in particular, to a system and method of prohibiting or limiting the functionality of a mobile electronic device of a driver in a vehicle during operation thereof.

BACKGROUND OF THE INVENTION

Personal electronic devices, such as mobile telephones, personal digital assistants (PDAs), digital music players, electronic gaming devices, DVD players, video entertainment systems and the like are increasingly becoming integrated for use within vehicles. Integration of these various devices is typically handled by a central processor within the vehicle. For example, hands free telephone systems (HFT) have been developed for vehicles that allow the hands free use of a driver's or passenger's mobile telephone. While use of the HFT has greatly lowered the distraction of drivers using the phone, it does not prevent a driver from otherwise holding the phone to talk, text message, surf the web, etc. The Johnson Controls, Inc. BlueConnect™ system helps solve this problem by allowing the driver to use speech recognition to make phone calls while keeping their hands on the steering wheel and eyes on the road. Even with the BlueConnect™ system, the driver can still "handle" the phone to make calls, check text messages (SMS), read emails, etc. Hence, there remains a significant potential for driver distraction while operating the vehicle, which distractions often lead to accidents and deaths. Recently, the US Senate announced they are starting legislation of a nation-wide ban on in-vehicle text messaging.

SUMMARY OF THE INVENTION

This invention relates generally to a system and method of prohibiting electronic device use in a vehicle, and in particular, to a system and method of prohibiting mobile electronic device, such as a phone, use of a driver in a vehicle during operation thereof, while allowing passengers to use their respective mobile devices.

An exemplary method for controlling the operability of the electronic device with the electronic device detection system begins by determining whether an electronic device is located within the vehicle and proximate to an operator of the vehicle. The electronic device detection system can be used to define a restricted zone in which electronic device use is partially or fully prohibited or disabled and a safe zone in which all or some of the functionality of electronic devices is enabled. Once it is determined that an electronic device is in use and within proximate location to the operator of the vehicle, i.e., the restricted zone, a determination is made as to whether any usage prohibition conditions are satisfied. Prohibition conditions may include, the state of vehicle (on/off, moving, stopped or parked), the speed of vehicle, whether the device is connected to a hands free talking system, an emergency situation exists, or any other condition or parameter that may be set to meet various requirements and qualifications. If usage prohibition conditions are satisfied, then particular functions of the electronic device may be disabled. If prohibition conditions are not met, the electronic device may be totally enabled, partially enabled to allow certain functions, or the electronic device is never disabled.

The present invention allows for situational control of an electronic device. That is, the electronic device may be enabled for use when it is safe or legal to be operable and disabled for use, in full or partially, when it is illegal or not safe.

These and other features and advantages of this invention will become more apparent to those skilled in the art from the detailed description of a preferred embodiment.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
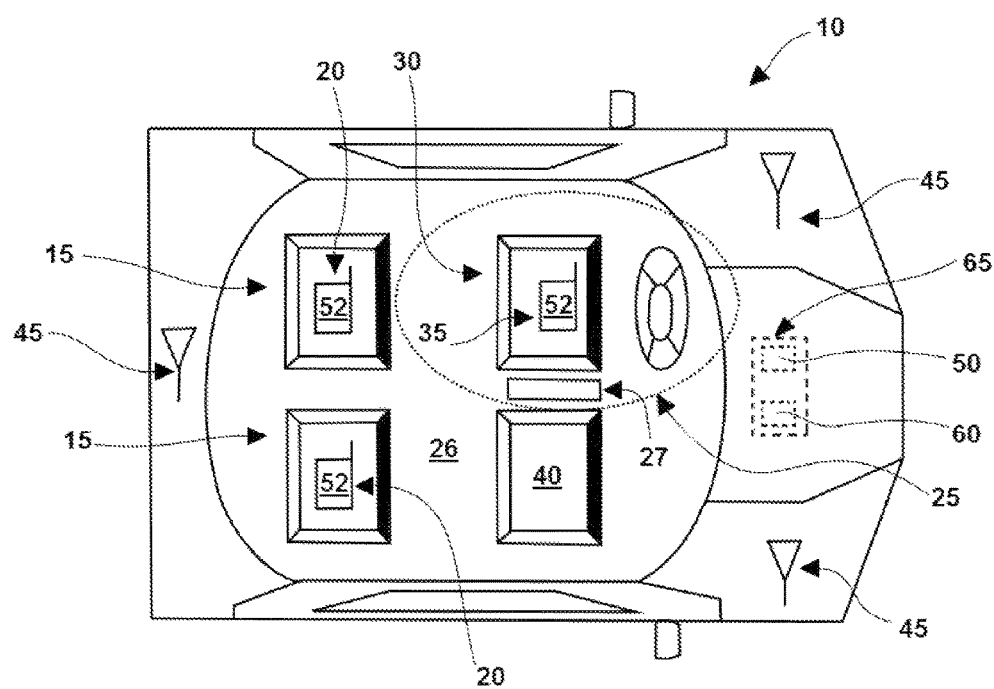
FIG. 1 illustrates a top view of an exemplary embodiment using directional sensors in accordance with the invention.

Referring to the Figures, wherein like numerals indicate corresponding parts throughout the several views, a system and method of prohibiting electronic device 52 use in a vehicle 10, and more particularly, a system and method of prohibiting or limiting the functionality of a mobile operator electronic device 35 of a driver in a vehicle 10 during operation thereof, while allowing passengers to use their respective mobile passenger electronic devices 20 is generally shown.

While the exemplary embodiment the electronic device 52 of the present invention is described with respect to a mobile phone, it is appreciated that the system and method may also be applied to non-mobile devices, such as wire-connected phones, computers, media players, PDA's, etc. In addition, the system and method may also be applied to any other mobile electronic devices 52 that are wirelessly connected. In the exemplary embodiment the electronic devices 52 may include passenger electronic devices 20 used by passengers within the vehicle 10 and operator electronic devices 35 used by the operator/driver of the vehicle 10. The electronic devices 52, e.g., passenger electronic devices 20 and operator electronic devices 35, may be any device, such as a cell phone, PDA, text messenger, or any other portable electronic device 52 capable of communication wirelessly over an in-vehicle or out-of-vehicle network.

An electronic device 52, according to the subject invention, is capable of performing multiple functions. For example, the functions of a mobile phone may include use of a keyboard, wireless transmitter, wireless receiver, text messaging, control of the ringer, e-mailing, web surfing, and hands free talking. These functions are merely exemplary and may include further functions and the functions may vary based on the electronic device 52 utilized.

Figure 2:
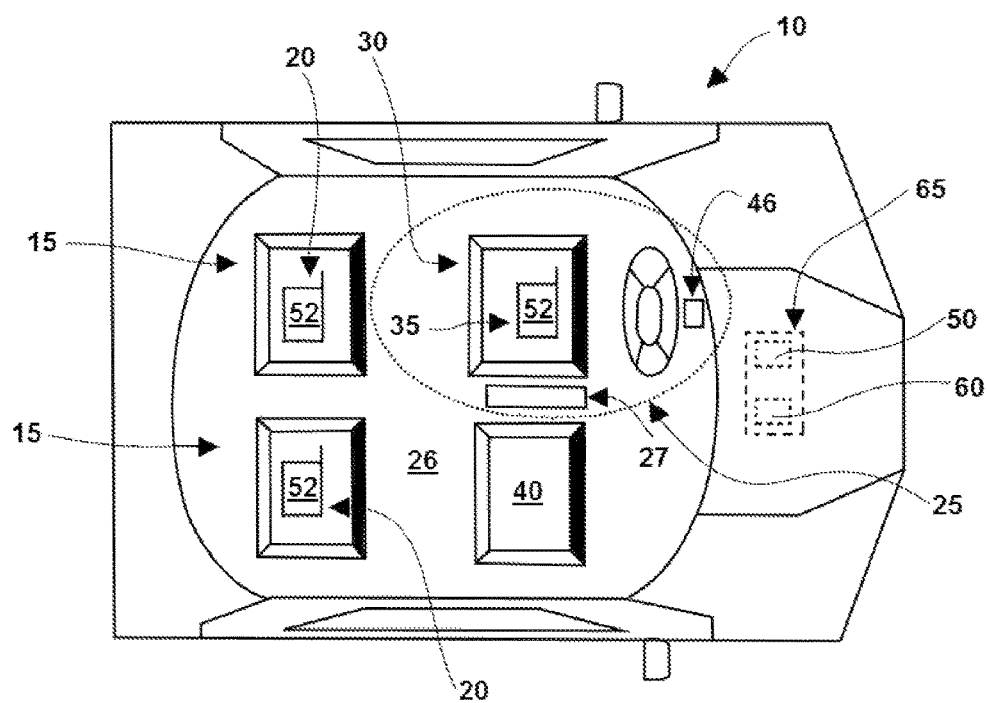
FIG. 2 illustrates a top view of an exemplary embodiment using image processing in accordance with the invention.

The vehicle 10 may be any vehicle 10, such as an automobile, truck, bus, airplane, train, tractor, or any other vehicle 10 requiring an operator to concentrate during operation. With reference to FIGS. 1 and 2, the vehicle 10 may include four seats 15, 30, 40, namely a pair of rear passenger seats 15, a vehicle operator seat 30 and a front passenger seat 40. The seating configuration may be any seating configuration known in the art and may vary based on the type of vehicle 10 the system of the present invention is applied to.

FIG. 1 illustrates a top view of an exemplary embodiment in accordance with the invention. In the illustrated exemplary embodiment, the passenger compartment of a vehicle 10 is generally shown equipped with an electronic device detection system 65 for detecting use and location of one or more electronic devices 52. The electronic device detection system 65 may be a control system capable of defining a restricted zone 25 and prohibition conditions and controlling the functionality of the electronic devices 52 based on its input. In FIGS. 1 and 2, the electronic device detection system 65 is entirely located within vehicle 10, and includes a detection device 50 and prohibition device 60 for detecting and prohibiting use of an electronic device 52, such as a mobile phone. The detection device 50 and prohibition device 60 are described in more detail below, with reference to FIG. 3. In other embodiments, electronic device detection system 65 is located remote from the vehicle 10 and connected, for example, by a network 55 (FIG. 3), described in further detail below.

An exemplary method for controlling the operability of the electronic device with the electronic device detection system 65 begins by determining whether an electronic device 52 is located within the vehicle 10 and proximate to an operator of the vehicle 10. The electronic device detection system 65 can be used to define a restricted zone 25 in which electronic device use is partially or fully prohibited or disabled and a safe zone 26 in which all or some of the functionality of electronic devices 52 is enabled. Once it is determined that an electronic device 52 is in use and within proximate location to the operator of the vehicle 10, i.e., the restricted zone 25, a determination is made as to whether any usage prohibition conditions are satisfied. Prohibition conditions may include, the state of vehicle 10 (on/off, moving, stopped or parked), the speed of vehicle 10, whether the device is connected to a hands free talking system (HFT), an emergency situation exists, or any other condition or parameter that may be set to meet various requirements and qualifications. If usage prohibition conditions are satisfied, then particular functions of the electronic device 52 may be disabled. If prohibition conditions are not met, the electronic device 52 may be totally enabled, partially enabled to allow certain functions, or the electronic device 52 is never disabled.

A determination of when an emergency has occurred may be made in several ways. In one embodiment, the electronic device detection system 65 of the vehicle 10 may be configured to communicate emergency information with the electronic device 52. For example, if an airbag deployment is detected by the vehicle 10, the electronic device 52 may be alerted via the electronic device detection system 65 that an emergency has occurred and the disabling of the electronic device 52 may be overridden such that the operator may use the operator electronic device 35 within the restricted zone 25 to notify the proper authorities of the emergency situation.

The electronic device detection system 65 may be used to define a predetermined restricted zone 25 and safe zone 26 within a vehicle 10. The restricted zone 25 is generally defined as the area proximate the operator/driver of the vehicle 10. The restricted zone 25 is the portion of the vehicle 10 in which an operator would be capable of having access to the electronic device 52 and as such, would be desirable for limiting the functionality of the electronic device 52 in the restricted zone 25 so that the operator may concentrate on driving and not the electronic device 52.

Additionally, the electronic device detection system 65 via a sensor may be used to define a safe zone 26. The safe zone 26 can be any area outside the predetermined restricted zone 25. Within the safe zone 26, the electronic device 52 may have full or partial functionality. In addition, the safe zone 26 could be a safe docking station 27 within the restricted zone 25. The safe docking system may include a wireless proximity sensor disposed within the glove department or center console that detects the presence of the electronic device 52 in proximity to the glove department or center console and thus enables certain functionality back to the electronic device 52 as long as the device remain in the safe docking station 27.

For example, a Near Field Communication (NFC) or other wireless proximity sensor as readily understood in the art, can be used to define the safe docking station 27 within the restricted zone 25 and detect that the device is stored in such a location (i.e. glove compartment, floor console, center console, etc.). Once the device is placed in the safe docking station 27, particular device functions, such as speech recognition and hands free calling may be enabled while still restricting functions such as text messaging, e-mailing, and keyboard ability that would otherwise be disabled due to the presence of the operator electronic device 35 within the restricted zone 25. As long as the electronic device 52 remains in the safe docking station 27, particular functions are enabled, but may be disabled if removed from the safe docking station 27 but remains within the restricted zone 25.

NFC provides intuitive, simple, and safe communication between electronic devices 52. Communication between two NFC-compatible devices occurs when they are brought within a short distance of one another. Typically, the short distance is in the range of approximately less than 10 centimeters. For example, a simple swipe of an NFC-enabled card past a card reader can establish an NFC connection. NFC can also be integrated into other electronic devices 52 such as cellular phones or NFC-enabled cards.

In response to a particular condition, such as the placement of an electronic device 52 in the restricted zone 25, the electronic device 52 may be disabled, or any number of the functions of the device may be restricted. That is, in response to a particular condition being detected by the detection device 50 of the electronic device detection system 65, for example placement in a restricted zone 25 while the vehicle 10 is in motion, may result in the electronic device 52 being jammed, e.g., RF jammed, or functions of the electronic device 52 being disabled, via the prohibition device 60 of the electronic device detection system 65, in order to prohibit the user in the restricted zone 25 from using the electronic device 52 to make an outgoing call, using the keyboard function, text message, use the internet feature, etc. The electronic device 52 may contain software and/or hardware, in communication with the electronic device detection system 65, that would regularly monitor the operations and functions of the electronic device 52 and automatically adjust the settings according to the situation that was observed by the electronic device detection system 65.

In one embodiment, as shown in FIG. 1, the electronic device detection system 65 may include directional sensors 45 to determine if an electronic device 52 is being used while in the vehicle 10. The directional sensors 45 may include radar, sonar, laser, pressure, GPS, cameras, image detection, triangulation or any other technology allowing the sensors 45 to determine the location of the person using the electronic device 52. The directional sensors 45 may further determine if the electronic device 52 is a passenger electronic device 20 placed outside the restricted zone 25 or an operator electronic device 35 disposed within the restricted zone 25. Because of a need to address these variations, the directional sensors 45 may be able to help determine the precise location of the vehicle 10, or specifically the electronic device 52, for use in making the restriction determinations. Therefore, a passenger of a vehicle 10 may not be limited in the use of the their passenger electronic devices 20 while located within the vehicle 10.

The directional sensors 45, for example antennas, are shown as being located in three positions in the vehicle 10. However, it is appreciated that they may be located in any position within the vehicle 10, including for example on the seats 15, 30, 40 or trim components. Moreover, the number of directional sensors 45 is not limited to three, and may include more or less as required to make the required location determination. The directional sensors 45, in connection with detection device 50 of the electronic device detection system 65, are used to determine the location of the electronic device 52 within the vehicle 10. Based upon the location of the electronic device 52 within the vehicle 10, e.g., the restricted zone 25, safe zone 26, or safe docking station 27, and any other existing prohibition condition, particular functions of the electronic device 52 may be enabled or disabled.

In one embodiment, the system uses wireless triangulation using Bluetooth™ (or a cellular signal) and speed of the vehicle 10 to determine if the phone is being used while in the vehicle 10. If the electronic device detection system 65 detects that the operator/driver is handling the electronic device 52 while the vehicle 10 is in use (e.g. moving), software in the phone (or in the vehicle 10 or remote from the vehicle 10) can prohibit the use or limit the functionality of the device, e.g., blank the display, prevent button/keyboard use, prevent wireless connection, etc.

As shown in FIG. 2, image processing may also be used to determine whether the operator has an electronic device 52 near their body. For example, an image sensor 46 in communication with the electronic device detection system 65 is provided in the overhead console, mirror, etc. of the vehicle 10 and directed toward the operator seat 30. Image detection is then used to determine whether the electronic device 52 is near the operator's body within the operator restricted zone 25, such that particular functions may be enabled and disabled as needed. That is, particular functions of the electronic device 52 can be prohibited from use when detected near the operator's body, and allowed otherwise. For example, if the electronic device 52, such as a operator electronic device 35, is near the head or ear of the operator or just with the predefined restricted zone 25, functionality is prohibited. If the electronic device 52, on the other hand, is the operator electronic device 35 placed and recognized as being in a safe zone 26 or safe docking station 27, then electronic device 52 use or specific functions, such as hands free calling may be enabled. It is appreciated that the image sensor 46 may be set to detect the electronic device 52 not only in the operator's seat, but any location in the vehicle 10. Moreover, prohibiting use of the electronic device 52 is not limited to detection near the head or ear of the operator, but may be set to any location.

It is also noted that an application (APP) may be used in conjunction with the electronic device 52 that would allow the device to be enabled and disabled when detected by the system at a location that is set as being prohibited. The APP could work with any form of detection, such as wireless triangulation, image detection, etc.

Detection may also occur from outside of the vehicle 10. For example, the vehicle 10 may be connected to a network 55 which accesses software for monitoring the vehicle 10 or multiple vehicles 10.

Figure 3:
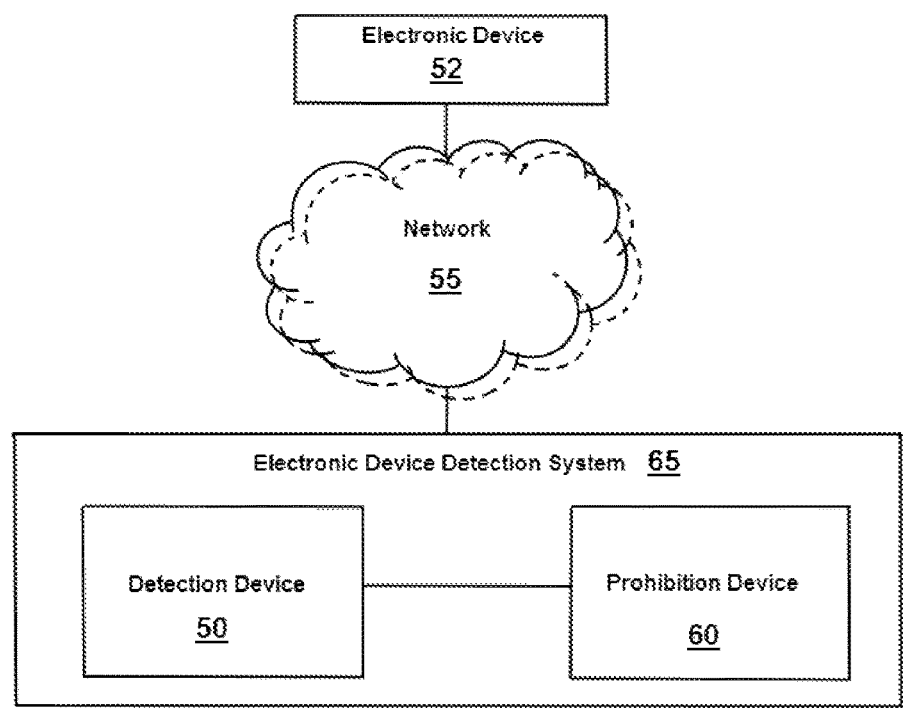
FIG. 3 illustrates an exemplary embodiment of the system connected to a network.

FIG. 3 illustrates an exemplary embodiment of the system connected to a network 55. In the illustrated embodiment, the system includes at least one electronic device 52, a network 55 and electronic device detection system 65, which includes the detection device 50 and the prohibition device 60. Here, the electronic device 52 is located with passengers, including the operator, of vehicle 10. The electronic device detection system 65 is remotely connected to the vehicle 10, and therefore the electronic device 52, in such a way to detect and prohibit device use. This is opposed to the embodiment of FIGS. 1 and 2, in which the system is located within vehicle 10 (although it may be wirelessly connected), not remotely. Network 55 may be any type of network 55, such as the Internet, LAN, WAN, satellite, or any other type of wireless communication network 55. Detection device 50, which may or may not include directional sensors 45 or an image sensor 46, provides the electronic device detection system 65 the ability to detect whether electronic devices 52 are located in a vehicle 10, and where the electronic devices 52 are located within the vehicle 10 itself. For example, by monitoring signal strength of RF power signals present at multiple locations (directional sensors 45), the detection device 50 is able to determine when an RF transmit device is used in the vehicle 10 and is further able to determine the approximate location of the RF transmit electronic device 52 in use. If it is determined that the electronic device 52 is being used by the operator of the vehicle 10, located in the restricted zone 25, prohibition device 60 prevents use of the electronic device 52 or particular functions associated with the operator electronic device 35. For example, RF jamming can be used to wirelessly "jam" the electronic device 52 usage unless safely connected to the in-vehicle interface or stored in a safe zone 26 or the safe docking station 27. Other techniques may also be used, such as partial prevention of button/keyboard use, turning off speaker and microphone capability, blanking the screen device, etc.

Figure 4:
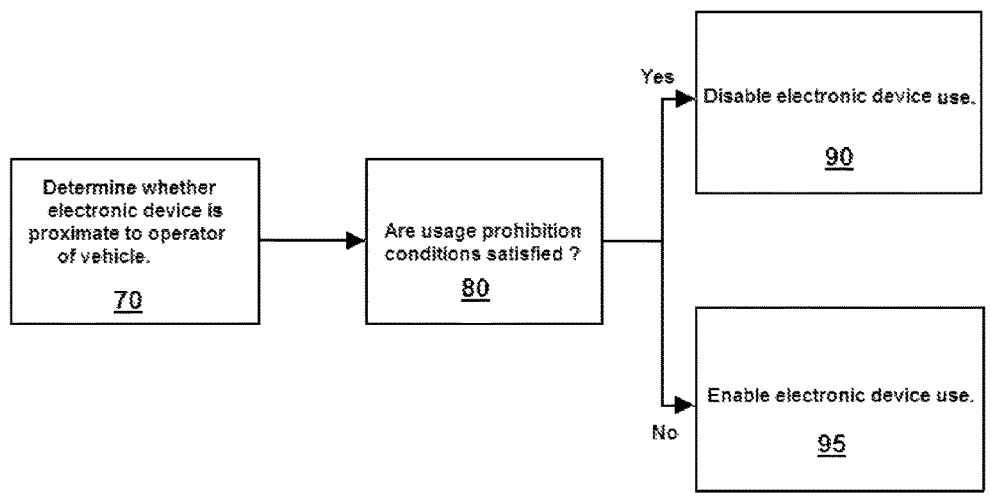
FIG. 4 illustrates an exemplary flow diagram of a method in accordance with the invention.

FIG. 4 illustrates an exemplary flow diagram of a method in accordance with the invention. The drawing illustrates an exemplary process for controlling the operability of the electronic device with the electronic device detection system 65. In step 70, a determination is made as to whether an electronic device 52 is located within a vehicle 10 and proximate to an operator of the vehicle 10. Once it is determined that an electronic device 52 is in use and within proximate location to the operator of the vehicle 10, a determination is made as to whether any usage prohibition conditions are satisfied, in step 80. Prohibition conditions may include, state of vehicle 10 (on/off), speed of vehicle 10, time, whether the device is connected to an HFT, the car is stopped or parked, an emergency situation exists, or any other condition or parameter that may be set to meet various requirements and qualifications. If usage prohibition conditions are satisfied, then the electronic device 52 is disabled at step 90. Otherwise, the electronic device 52 is enabled (or not disabled) in step 95.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A method for controlling operability of an electronic device, said method comprising:
   providing a zone sensor to define a restricted zone within a vehicle proximate to an operator of a vehicle and a first safe zone outside of the restricted zone;
   providing a single proximity sensor, which is separate from the zone sensor, within a glove compartment, a floor console, or a center console of the vehicle to define the glove compartment, floor console, or center console as a second safe zone which is located within the confines of the restricted zone;
   determining whether the electronic device is located within the vehicle and within the restricted zone using the zone sensor;
   in response to the electronic device being determined to be within the restricted zone by the zone sensor, determining whether the electronic device is located within the second safe zone using only the single proximity sensor;
   determining whether at least one usage prohibition condition exists;
   disabling at least a portion of the functionality of the electronic device in response to the electronic device being located within the restricted zone proximate to the operator of the vehicle and further in response to the determined at least one usage prohibition condition; and
   enabling at least the portion of the functionality of the electronic device that was previously disabled due to the electronic device being detected as located in the restricted zone in response to the single proximity sensor determining that the electronic device has been moved into the second safe zone.

2. The method as set forth in claim 1 wherein the zone sensor is an image sensor located within the vehicle.

3. The method as set forth in claim 1 wherein the zone sensor is a directional sensor located within the vehicle.

4. The method as set forth in claim 1 wherein the zone sensor comprises a plurality of antennas within the vehicle using triangulation for determining the position of the electronic device within the vehicle.

5. The method as set forth in claim 1 wherein the determining whether the usage prohibition condition exists further comprises determining whether the vehicle is in motion.

6. The method as set forth in claim 1 wherein the usage prohibition condition includes determining at least one of the state of vehicle, the speed of vehicle, the device being connected to a hands free talking system, or an emergency situation.

7. The method as set forth in claim 1 wherein said wireless proximity sensor is a Near Field Communication (NFC) sensor.

8. A method for controlling the operability of an electronic device, said method comprising:
   providing a plurality of directional sensors to define a restricted zone within a vehicle proximate to an operator of the vehicle and a first safe zone outside of the restricted zone;
   providing a single proximity sensor, which is separate from the plurality of directional sensors, within a glove compartment, a floor console, or a center console of the vehicle to define the glove compartment, floor console, or center console as a second safe zone which is located within the confines of the restricted zone,
   determining if the electronic device is located within the restricted zone proximate to an operator seat of a vehicle using the plurality of directional sensors;
   determining if the electronic device is located within the second safe zone using only the single wireless proximity sensor;
   determining a prohibition condition of the electronic device;
   disabling the transmitter on the electronic device in response to the electronic device being located in the restricted zone proximate to the operator seat of the vehicle; and
   enabling the transmitter on the electronic device that was previously disabled due to the electronic device being detected in the restricted zone in response to the single wireless proximity sensor determining that the electronic device has been moved into the second safe zone.

9. The method as set forth in claim 8 wherein said wireless proximity sensor is a Near Field Communication (NFC) sensor.

10. A system for controlling operability of an electronic device, the system comprising:
    a zone sensor configured to define a restricted zone within a vehicle proximate to an operator of a vehicle and a first safe zone outside of the restricted zone;
    a single proximity sensor, which is separate from the zone sensor, within a glove compartment, a floor console, or a center console of the vehicle to define the glove compartment, floor console, or center console as a second safe zone which is located within the confines of the restricted zone;
    a detection device configured to determine whether the electronic device is located within the vehicle and within the restricted zone using the zone sensor, wherein the detection device is further configured to, in response to the electronic device being determined to be within the restricted zone by the zone sensor, determine whether the electronic device is located within the second safe zone using only the single proximity sensor, wherein the detection device is further configured to determine whether at least one usage prohibition condition exists; and
    a prohibition device configured to disable at least a portion of the functionality of the electronic device in response to the electronic device being located within the restricted zone proximate to the operator of the vehicle and further in response to the determined at least one usage prohibition condition, wherein the prohibition device is further configured to enable at least the portion of the functionality of the electronic device that was previously disabled due to the electronic device being detected as located in the restricted zone in response to the single proximity sensor determining that the electronic device has been moved into the second safe zone.

\* \* \* \* \*